US009641458B2

(12) United States Patent
Viens et al.

(10) Patent No.: US 9,641,458 B2
(45) Date of Patent: May 2, 2017

(54) PROVIDING EFFICIENT ROUTING OF AN OPERATIONS, ADMINISTRATION AND MAINTENANCE (OAM) FRAME RECEIVED AT A PORT OF AN ETHERNET SWITCH

(71) Applicant: Accedian Networks Inc., St-Laurent (CA)

(72) Inventors: Yanick Viens, St-Jean-sur-Richelieu (CA); Steve Rochon, Brossard (CA)

(73) Assignee: Accedian Network Inc., Sai (CA)

( * ) Notice: Subject to any disclaimer, the term of this patent is extended or adjusted under 35 U.S.C. 154(b) by 114 days.

(21) Appl. No.: 14/625,724

(22) Filed: Feb. 19, 2015

(65) Prior Publication Data
US 2016/0248667 A1   Aug. 25, 2016

(51) Int. Cl.
H04L 12/24      (2006.01)
H04L 12/935     (2013.01)
H04L 12/26      (2006.01)
H04L 12/947     (2013.01)
H04L 12/861     (2013.01)
H04L 12/801     (2013.01)

(52) U.S. Cl.
CPC ......... H04L 49/3009 (2013.01); H04L 43/10 (2013.01); H04L 43/50 (2013.01); H04L 49/25 (2013.01); H04L 47/11 (2013.01); H04L 47/115 (2013.01); H04L 47/35 (2013.01); H04L 49/9057 (2013.01)

(58) Field of Classification Search
CPC ............. H04J 2203/0057; H04L 47/35; H04L 2012/5625; H04L 43/10; H04L 47/50
See application file for complete search history.

(56) References Cited

U.S. PATENT DOCUMENTS

2012/0170585 A1* 7/2012 Mehra ..................... H04L 45/24
                                                     370/400
2016/0112328 A1* 4/2016 Anand ..................... H04L 47/22
                                                     370/236.2

* cited by examiner

Primary Examiner — Ian N Moore
Assistant Examiner — Mewale Ambaye
(74) Attorney, Agent, or Firm — Nixon Peabody LLP

(57) ABSTRACT

A system for efficient routing of an OAM) frame in an Ethernet switch receives an OAM frame at a first port; building a first classification key dependent on an OAM frame header; classifies in a context of the first port to create a first classification; resolves action dependent on the first classification; modifies the first classification key to create a second classification key; classifies the frame in a context of the second port to create a second classification; sends the second classification key to an OAM engine coupled to the Ethernet switch for modification into a third classification key; receives the third classification key from the OAM engine; modifies the third classification key into a final classification key; modifies the header of the OAM frame with the final classification key; and sends the modified OAM frame to a switching fabric of the Ethernet switch.

8 Claims, 7 Drawing Sheets

PROVIDING EFFICIENT ROUTING OF AN OPERATIONS, ADMINISTRATION AND MAINTENANCE (OAM) FRAME RECEIVED AT A PORT OF AN ETHERNET SWITCH

FIELD OF THE INVENTION

The present disclosure relates to data networks, and in particular routing Ethernet frames.

BACKGROUND

Most data networks implement routing protocols derived from standard bodies such as IEEE, IETF and ITU. Although these protocols are effective, they are complex and define many discrete steps for processing an Ethernet frame/IP packet by a router. Once received, classification, action resolution, header modification, etc. occurs several times to a single Ethernet frame before it finally leaves the router and is transmitted to the next network element. Such protocols are resource intensive and can influence network performance, such as latency. These protocols are implemented either in software or in high logic block count FPGAs or resource intensive ASICs. It would be ideal to determine a method of implementing routing protocols that overcomes some of the problems found in the prior art.

In the following description, the term Ethernet switch also refers to a router, bridge and any other Ethernet device with more than one port that has the capability to receive an Ethernet packet on one port and transmitting it on another port.

Shown in FIG. 1 is a simplified diagram of a data network 120 comprising two Ethernet switches 100 and 102, in communication one with the other via data network 120. Ethernet switches 100 and 102 comprise in this example n communication interfaces, also known as ports, 101.1, 101.2, ... 101.n and 103.1, 103.2, ... 103.n respectively. In this particular example, network 120 is configured such that port 101.2 of Ethernet switch 100 is coupled to port 103.1 of Ethernet switch 102. Operations, administration and maintenance (OAM) features supported by network equipment is used as a means for fault detection and equipment testing. In this example, a test set 104 is coupled to port 101.1 and transmits Ethernet frames comprising OAM messages for turning on OAM features supported by the Ethernet switches 100, 102. For simplification, Ethernet frames comprising OAM messages are referred to herein generically as OAM frames.

The data path 105 shows the path of OAM frames transmitted by test set 104 for performing a terminal loopback on Ethernet switch 102 port #2 103.2. The path 105 of an OAM frame is as follows: received by port 101.1, then to port 101.2 for transmission into the network 120 to be received by port 103.1 and sent to port 103.2 for processing as a loopback OAM which then turns around the OAM frame back to port 103.1. The OAM frame is transmitted via the network 120 to Ethernet switch 100 and received by 101.2, routed to 101.1 to be transmitted back to the test set 104.

Referring to FIG. 2, shown is a simplified block diagram of Ethernet switch 102 and the path 105 of the OAM frame. Each port 103.1, 103.2 ... 103.n has a transmitter (Tx) 116.1, 116.2, ... 116.n, 116.1, 116.2, ... 116.n and receiver (Rx) 114.1, 114.2, ... 114-n pair for transmitting data to, and receiving data from the network 120. The ports may comprise optical transmitters and receivers. Alternatively, the ports may comprise electrical transmitters and receivers. Each port also comprises a MAC layer function 201.1, 201.2 ... 201.n, and input function 203.1, 203.2 ... 203.n and an output function 213.1, 213.2 ... 213.n.

The OAM frame is processed by each functional block along the path 105. In this example, the OAM frame is received by a receiver 114.1 of port 103.1 and sent for processing at the Medium Access Control (MAC) layer 201.1 which implements standard MAC receive (RX) and transmit processing (TX).

The MAC layer 201.1 transmits the OAM frame to an input function 203.1. The input function 203.1 processes the frame and sends it to the destination port output function 213.2. The output function 213.2 identifies the frame as an OAM frame and transmits it to the OAM engine 205 via a switching fabric 204. If the OAM frame is a terminal loopback request for port 2 103.2, the OAM engine 205 transmits the OAM frame to port #2 input function 203.2 via the switching fabric 204. The input function 203.2 performs the required processing for an OAM loopback frame. The OAM frame is then switched by the switching fabric 204 to the output function of port #1 213.1, and sends back to output function 213.1 of port #1 103.1 via the input function 203.2 then the switching fabric 204 and the OAM engine. The OAM frame is then transmitted back onto path 105 to test set 104 (not shown).

In this example, a terminal OAM loopback requires that the OAM frame is transmitted to OAM engine 205 twice and through the switching fabric 204 four times, consuming the limited bandwidth and impacting capacity or requiring costly overdesign.

Referring to FIG. 3, shown is a simplified block diagram of a prior art input function 203.1, 203.2 ... 203.n processing of an OAM frame. The OAM frame is received from the MAC 201.1 and stored in in temporary frame buffer 304. Block 300 extracts the OAM frame header to build a classification key by filling key structure fields such as MAC source and destination addresses, ITU-T Y.1731, TPID, VID, Ethertype, IP source and destination addresses, etc. Block 302 classifies the OAM frame and resolves the action that should be performed, for example, based on user configuration of the switch or a classification map. Block 303 modifies the originally received frame stored in temporary frame buffer 304 based on the classification and action resolution of 302. In this example, the frame is an OAM frame and the OAM frame is modified such that when it is received by the switch fabric 204 it is routed to OAM engine 205. As block 203.1 is on an ingress port, the processing of the OAM frame within 203.1 is done in the context of an ingress port.

Referring to FIG. 4, shown is a simplified block diagram of the prior art output function 213.1, 213.2 ... 213.n processing the OAM frame transmitted from the OAM engine 205, through switching fabric 204. The OAM frame is received from the switching fabric 204 and stored in in temporary frame buffer 308. Block 305 extracts the OAM frame header to build a classification key by filling key structure fields such as MAC source and destination addresses, ITU-T Y.1731, TPID, VID, Ethertype, IP source and destination addresses, etc. Block 306 classifies the OAM frame and resolves the action that should be performed based on the user configuration of the switch. Block 307 modifies the originally received frame stored in temporary frame buffer 308 based on the classification and action resolution of block 306.

SUMMARY

In accordance with one embodiment, a system and method are provided for efficient routing of an Operations, Administration and Maintenance (OAM) frame received at a first port and terminating on a second port of an Ethernet switch by receiving an OAM frame at a first port; building a first classification key dependent on an OAM frame header; classifying in a context of the first port to create a first classification; resolving action dependent on the first classification; modifying the first classification key to create a second classification key; classifying the frame in a context of the second port to create a second classification; sending the second classification key to an OAM engine coupled to the Ethernet switch for modification into a third classification key; receiving the third classification key from the OAM engine; modifying the third classification key into a final classification key; modifying the header of the OAM frame with the final classification key; and sending the modified OAM frame to a switching fabric of the Ethernet switch. One implementation, includes storing a received OAM frame in a temporary frame buffer, and retrieving the stored OAM frame for use in the modifying of the OAM frame with the final classification key; extracting the OAM frame header from a received OAM frame, and using the extracted OAM frame header in the building of the first classification key; and determining whether a received frame is to be discarded after the creation of the first classification, and if the answer is negative, determining whether a loopback of the received frame is required on the first port, and if such a loopback is required, sending the first classification key to the OAM engine. It is preferred that the second, third and final classification keys are created only if it is determined that a loopback is not required on the first port.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
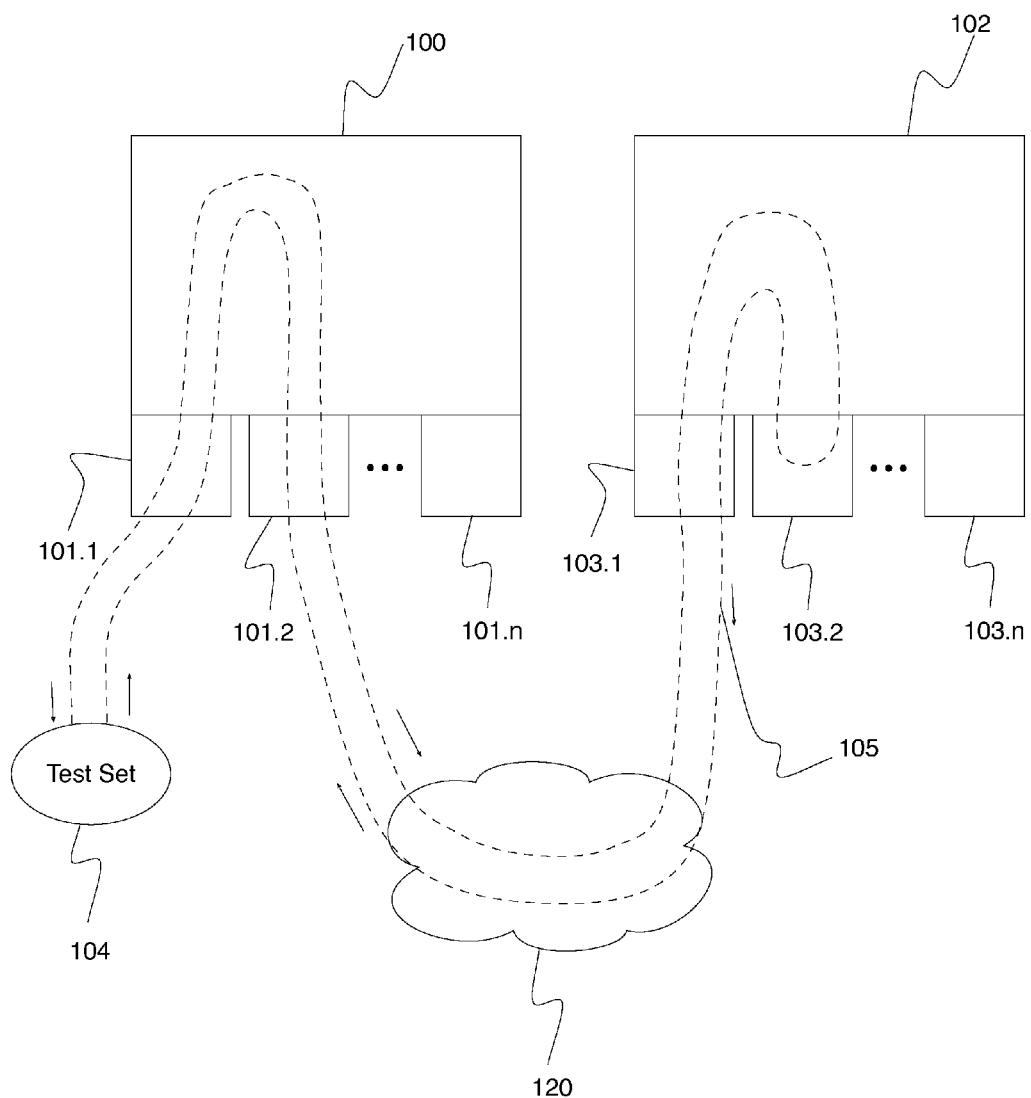
FIG. 1 is a diagram showing the path of an OAM frame in the prior art.
Figure 2:
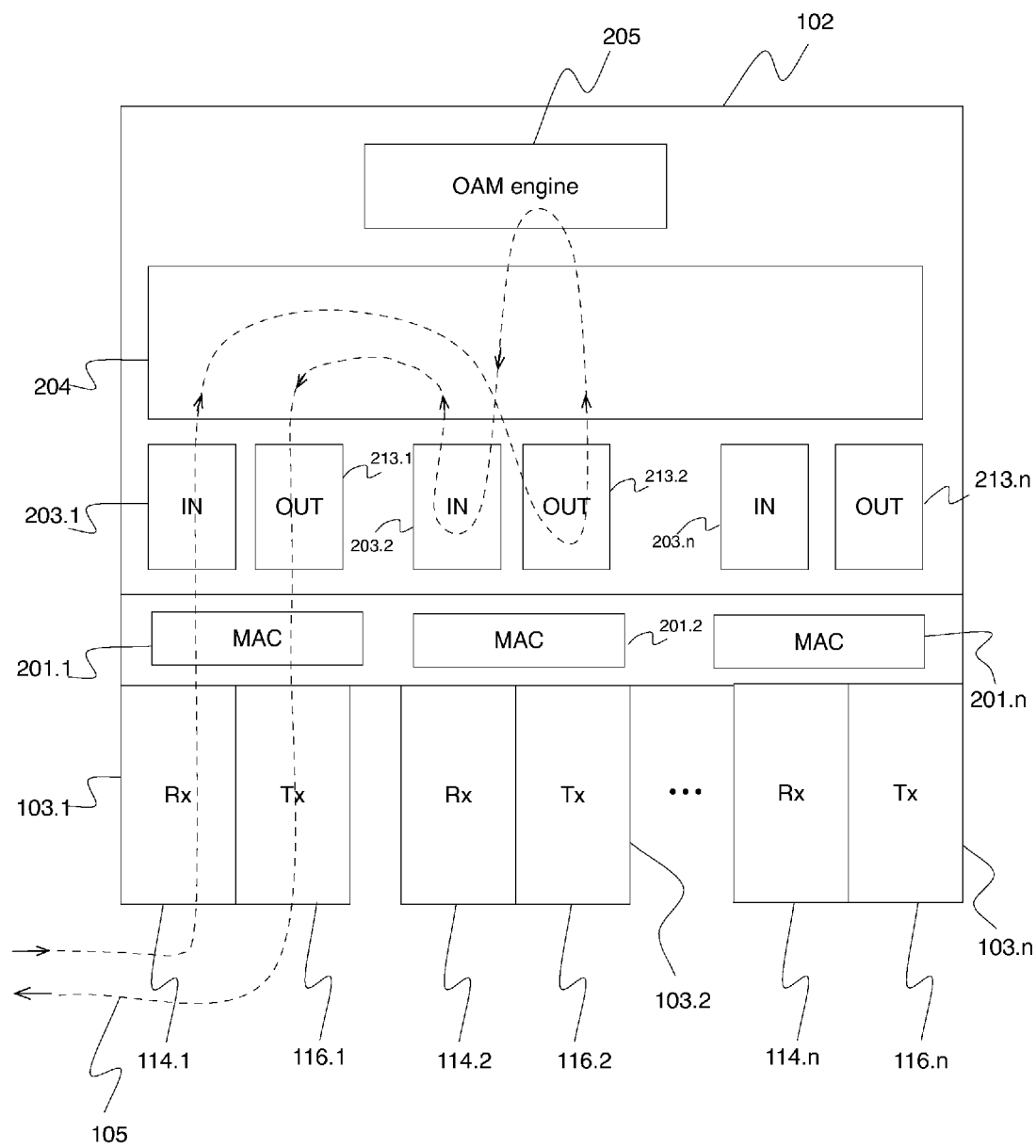
FIG. 2 is a diagram showing the components of a device receiving an OAM frame in the prior art.
Figure 3:
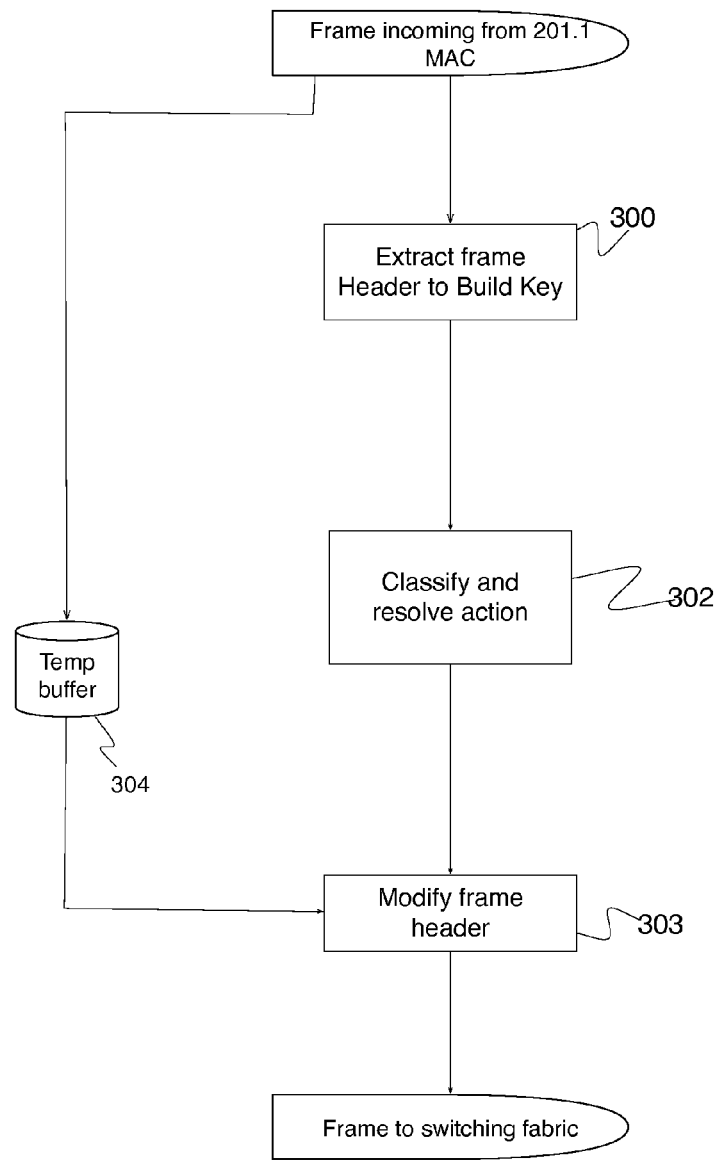
FIG. 3 is a diagram showing the input function for a port in prior art device.
Figure 4:
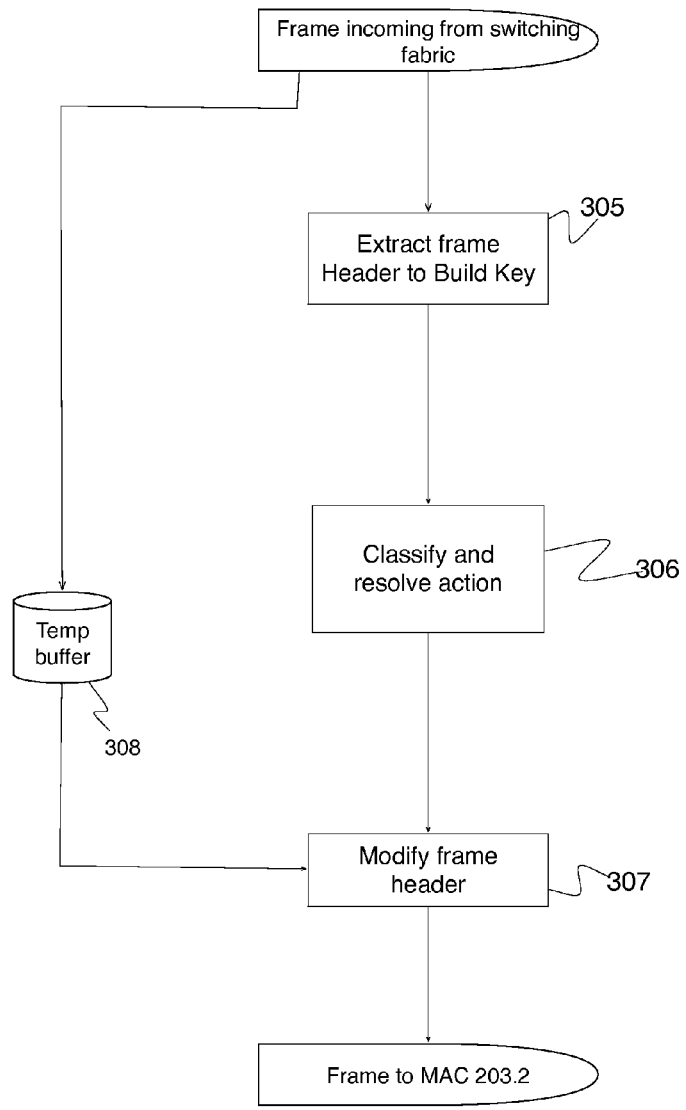
FIG. 4 is a diagram showing the output function for a port in prior art device.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Figure 5:
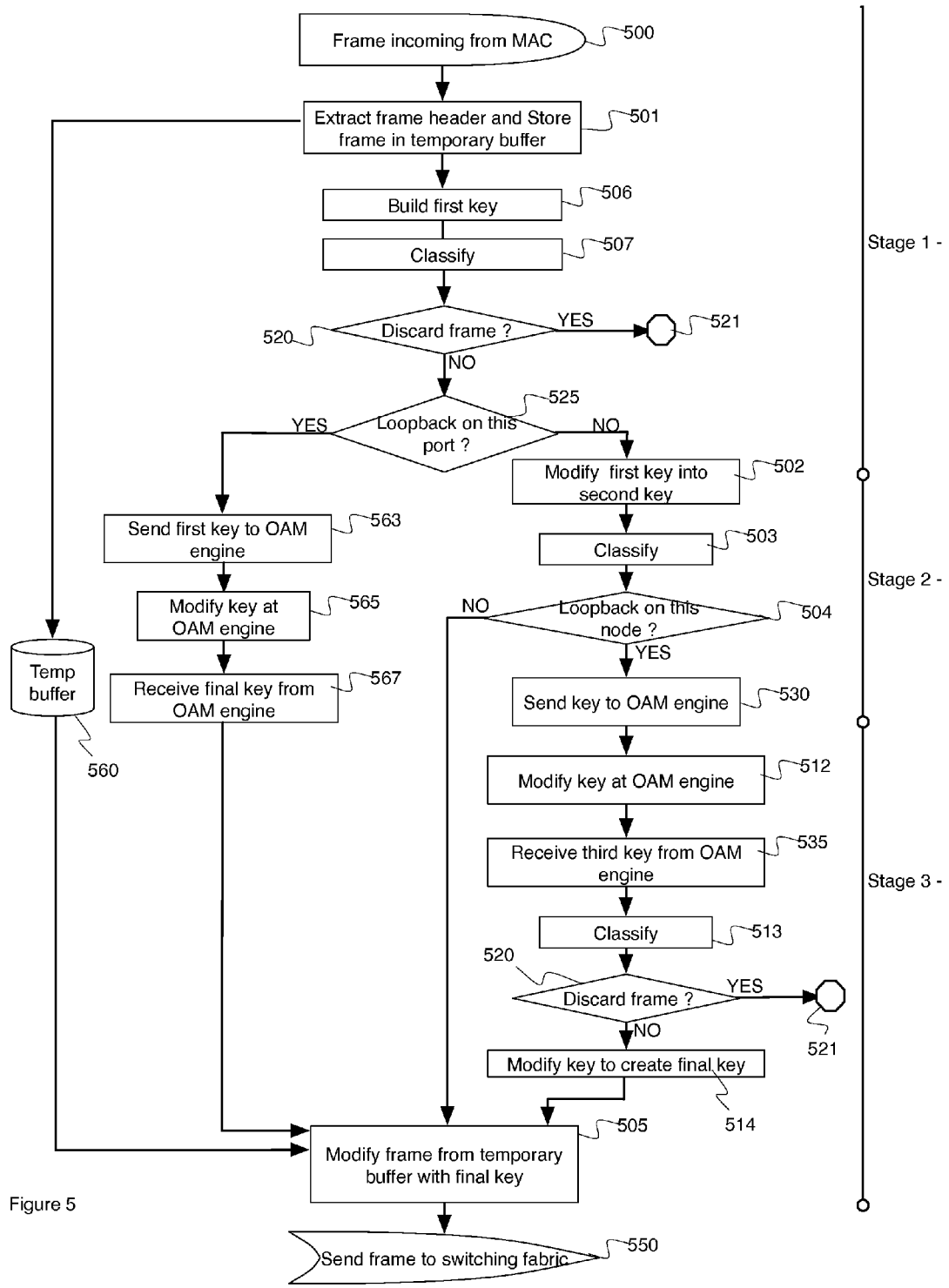
FIG. 5 is a block diagram of a three-stage classifier.

FIG. 5 is a flow diagram of a routine that can be implemented in a processor configured to process an OAM frame by an embodiment referred to as a three-stage classifier, which is implemented in the input function 203.1, 203.2 . . . 203.n of a port. To simplify the description of this embodiment, it is assumed that an OAM frame is received at a first port 114.1 and the OAM frame is switched to either be transmitted on a second port 116.2 or to be loopback by the output function of the second port 213.2. In this case, the three-stage classifier functionality is executed only by the input function of the first port 203.1.

When the OAM frame is received at the first port 114.1 input function 203.1 from the MAC 201.1 at step 500, it is copied to a temporary frame buffer 560 and the frame header is extracted at step 501. A first classification key is built at step 506 based on the frame header by filling key structure fields such as MAC source and destination addresses, ITU-T Y.1731, TPID, VID, Ethertype, IP source and destination addresses, etc.

The input function 203.1 of the first port performs a first classification at step 507, and the actions derived from the first classification are resolved. For example, based on user configuration of the switch or a classification map. Step 520 determines whether to discard the incoming frame. If "yes," the incoming frame is discarded at step 521 with no further processing, and if "no," step 525 determines whether a loopback is required on this port. In this first stage, the classification is done in the context of the input function 203.1 of port #1.

If step 525 determines the OAM frame is a loopback to be terminated on the same port (in this example port #1), then only the first classification key is sent to the OAM engine at step 563. The OAM engine modifies the first classification key and performs the required actions for an OAM frame. The key is modified by the OAM engine at step 565 to produce a final classification key and returned to the input function of the first port. When the input function of the first port 203.1 receives the final classification key from the OAM engine at step 567, it retrieves the frame from the temporary buffer 560 and modifies the header based on the final classification key at step 505. The frame is then sent to the output port function of the first port 213.1 via the switching fabric 204 at step 550.

If the OAM frame is destined for a different port (in this example the second port 114.2) at step 525, the input function of the first port 203.1 modifies the first classification key at step 502 to create a second classification key as if it is done by the output function of the second port. The frame is then classified by the input function of the first port 203.1 in the context of the second port to create a second classification at step 503. In this case, the first port is masquerading the modification and classification as if it is performed by the second port.

The input function of the first port checks if the OAM frame is a loopback for another port of this node at step 504. If not, then the second classification key is the final classification key, and it is applied to the frame that is retrieved from the temporary buffer 650 at step 505. The frame is then sent to the output port function of the first port 213.1 via the switching fabric 204 at step 550.

If step 504 determines that the OAM frame is a loopback for another port of this node, then only the second classification key is sent to the OAM engine at step 530. The OAM engine modifies the second classification key and resolves the required actions for an OAM frame. The second classification key is modified by the OAM engine at step 512 to create a third classification key and returned to the input function of the first port. When the input function of the first port 203.1 receives the third classification key from the OAM engine at step 535, it performs classification in the context of the second port at step 513. Then, actions are resolved, based on user configuration of the switch or a classification map, which may include discarding the frame at step 520, in which case no more processing is done at step 521. The third classification key is modified again at step 514 to create a final classification key, and the input function of the first port retrieves the frame from the temporary buffer 560 to modify the header based on the final classification key at step 505. The frame is then sent to the output port function of the first port 213.1 via the switching fabric 204 at step 550.

In this embodiment, the OAM frame is not sent to the OAM engine 205, but only the key which is much smaller and requires much less bandwidth from the switching fabric.

Figure 6:
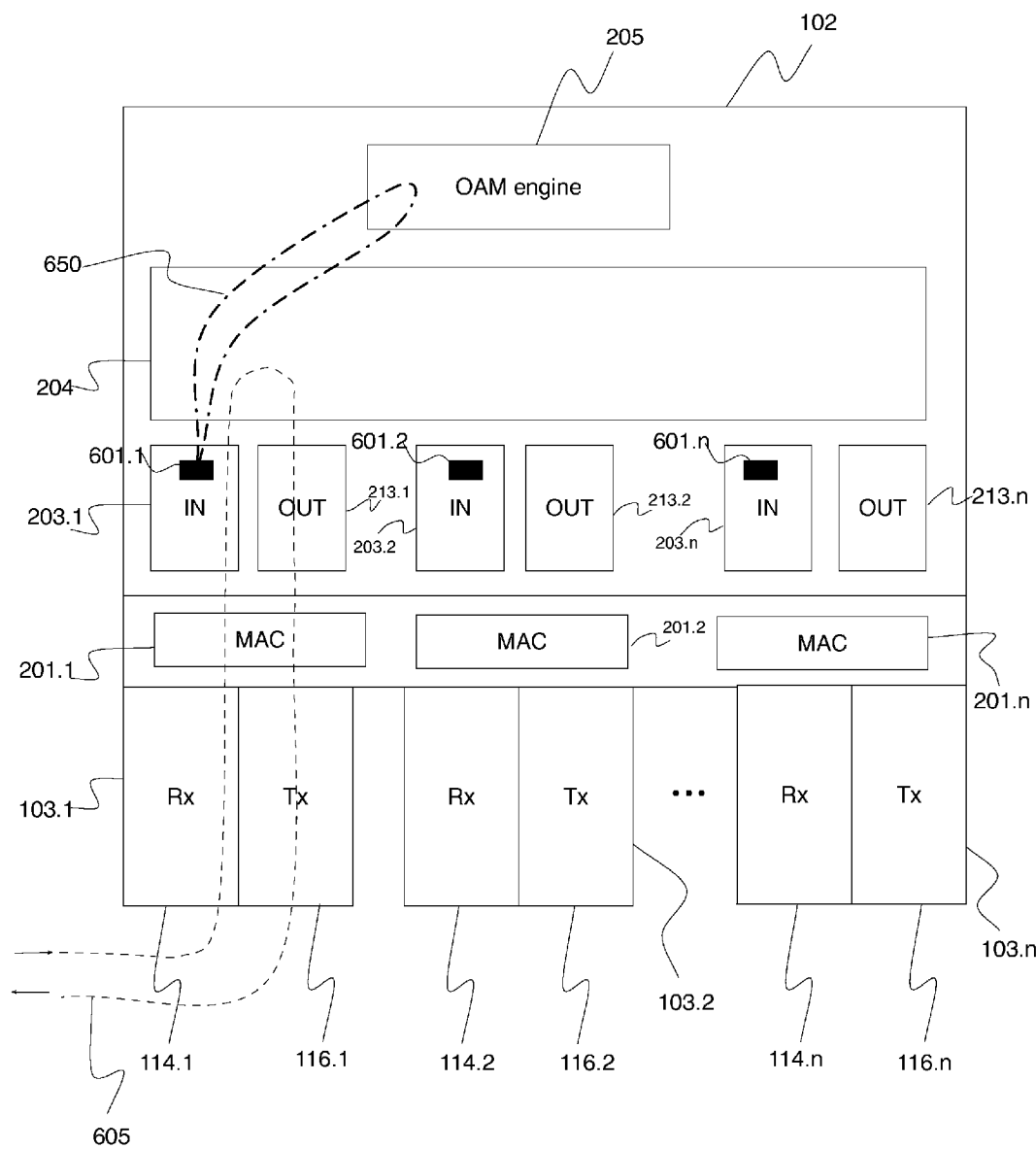
FIG. 6 is a diagram showing the path of an OAM frame using the three-stage classifier embodiment.

FIG. 6 shows the path 605 of the OAM frame in a node implementing the embodiment described herein. In this example, the three-stage classifier 601.1, 601.2 . . . 601.n is implemented in the input function of each port 203.1, 203.2 . . . 203.n which reduces the usage of the switching fabric 204 by a factor of 2. Only a key 650 (generally much smaller than the OAM frame) is sent at step 530 from the three-stage classifier function 601 to the OAM engine 205 and back. Using this embodiment, the first port 114.1 masquerades the loopback function of the second port 114.2, without requiring four processing of the OAM frame by the switching fabric. The OAM frame remains local to the first port.

Optionally there is a distributed knowledge of the port status, such that the first port only performs the loopback on behalf of the second port if it is known that the second port is available and not in a failure or out-of-service mode.

Figure 7:
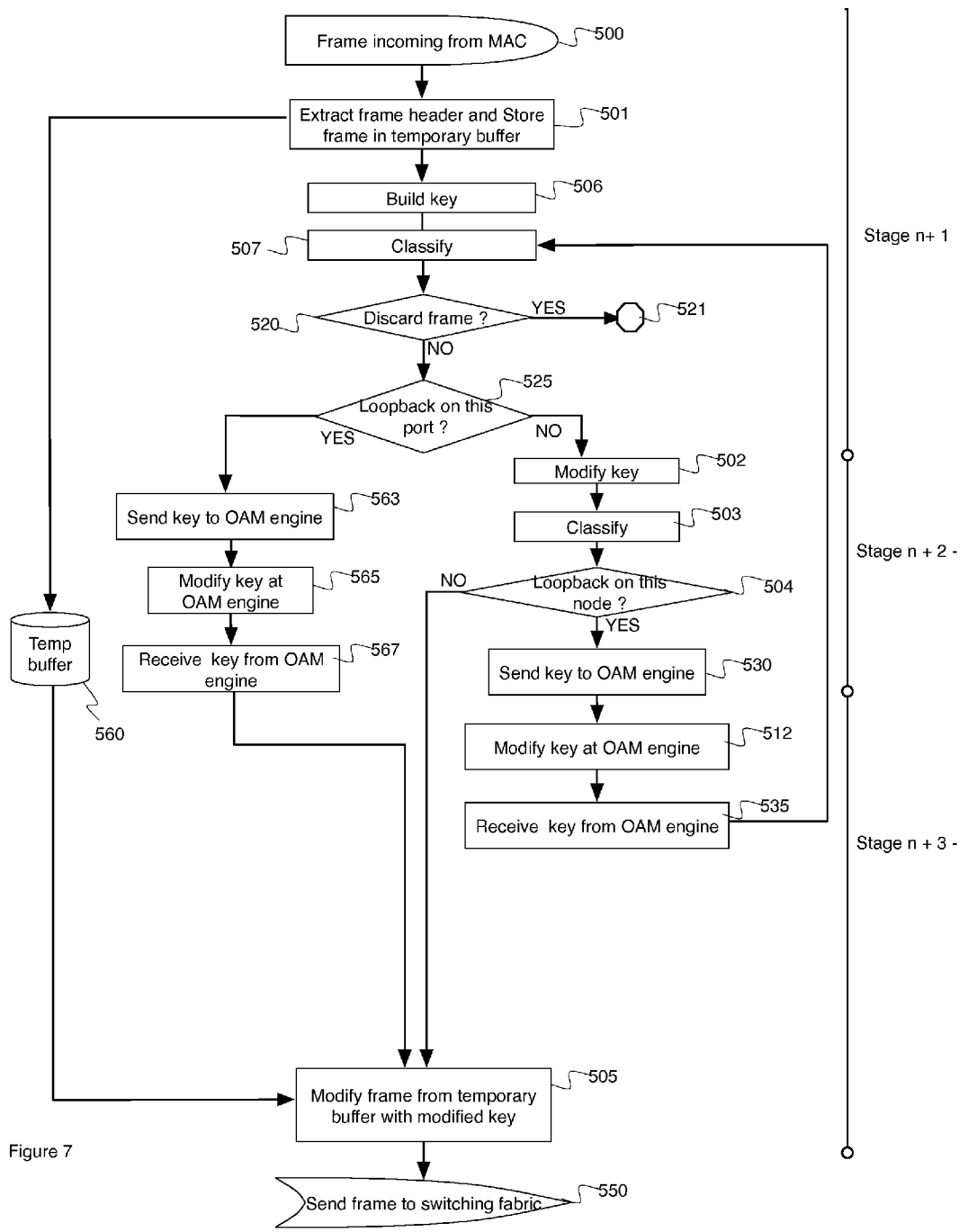
FIG. 7 is a block diagram of an n-stage classifier.

FIG. 7 shows another embodiment, based on the same flow chart of FIG. 5. The embodiment performs n-stages of classification by resolving multiple loopback. The difference in this case, is that when the key is received from the OAM engine at step 535, another stage of classification is performed at step 507.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for efficient routing of an Operations, Administration and Maintenance (OAM) frame received at a first port and terminating on a second port of an Ethernet switch, said method comprising:
   receiving an OAM frame at a first port;
   building a first classification key dependent on an OAM frame header;
   classifying in a context of the first port to create a first classification;
   determining whether the received OAM frame is to be discarded after the creation of said first classification, and if an answer is negative, determining whether a loopback of said received OAM frame is required on said first port, and if the loopback is required, sending said first classification key to an OAM engine coupled to the Ethernet switch;
   resolving action dependent on said first classification;
   modifying the first classification key to create a second classification key;
   classifying the received OAM frame in a context of the second port to create a second classification;
   sending the second classification key to the OAM engine for modification into a third classification key;
   receiving the third classification key from the OAM engine;
   modifying the third classification key into a final classification key;
   modifying the header of the received OAM frame with the final classification key; and
   sending the modified OAM frame to a switching fabric of the Ethernet switch.

2. The method of claim 1 which includes storing the received OAM frame in a temporary frame buffer, and retrieving the stored OAM frame for use in said modifying of the received OAM frame with said final classification key.

3. The method of claim 1 which includes extracting said OAM frame header from the received OAM frame, and using the extracted OAM frame header in said building of said first classification key.

4. The method of claim 1 in which said second, third and final classification keys are created only if it is determined that the loopback is not required on said first port.

5. A system for efficient routing of an Operations, Administration and Maintenance (OAM) frame received at a first port and terminating on a second port of an Ethernet switch, said system comprising;
   a memory coupled to a processor, the processor configured to:
   receive an OAM frame at a first port;
   build a first classification key dependent on an OAM frame header;
   classify in a context of the first port to create a first classification;
   determine whether the received OAM frame is to be discarded after the creation of said first classification, and if an answer is negative, determining whether a loopback of said received OAM frame is required on said first port, and if the loopback is required, sending said first classification key to an OAM engine coupled to the Ethernet switch;
   resolve actions dependent on said first classification;
   modify the first classification key to create a second classification key;
   classify the received OAM frame in a context of the second port to create a second classification;
   send the second classification key to the OAM engine for modification into a third classification key;
   receive the third classification key from the OAM engine;
   modify the third classification key into a final classification key;
   modify the header of the received OAM frame with the final classification key; and
   send the modified OAM frame to a switching fabric of the Ethernet switch.

6. The system of claim 5 in which said processor is configured to store the received OAM frame in a temporary frame buffer, and retrieve the stored OAM frame for use in modifying the received OAM frame with said final classification key.

7. The system of claim 5 in which said processor is configured to extract said OAM frame header from the received OAM frame, and use the extracted OAM frame header to build said first classification key.

8. The system of claim 5 in which said processor is configured to create said second, third and final classification keys only if it is determined that the loopback is not required on said first port.

* * * * *